US012516651B2

(12) United States Patent
Froihofer et al.

(10) Patent No.: US 12,516,651 B2
(45) Date of Patent: Jan. 6, 2026

(54) HIGH-PRESSURE FUEL PUMP WITH PRESSURE LIMITING VALVE ARRANGEMENT

(71) Applicant: Robert Bosch GmbH, Stuttgart (DE)

(72) Inventors: Thomas Froihofer, Brackenheim (DE); Rainer Kornhaas, Stuttgart (DE); Guido Bredenfeld, Friedrichshafen (DE); Stephan Wehr, Heiligenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 18/292,576

(22) PCT Filed: Jun. 9, 2022

(86) PCT No.: PCT/EP2022/065631
§ 371 (c)(1),
(2) Date: Jan. 26, 2024

(87) PCT Pub. No.: WO2023/006288
PCT Pub. Date: Feb. 2, 2023

(65) Prior Publication Data

US 2024/0344492 A1 Oct. 17, 2024

(30) Foreign Application Priority Data

Jul. 28, 2021 (DE) ..................... 10 2021 208 117.7

(51) Int. Cl.
*F02M 63/00* (2006.01)
*F02M 59/46* (2006.01)

(52) U.S. Cl.
CPC .......... *F02M 63/005* (2013.01); *F02M 59/46* (2013.01)

(58) Field of Classification Search
CPC ...... F02M 59/027; F02M 59/44; F02M 59/46; F02M 63/005; F02M 63/0005; F04B 49/22; F04B 19/04; F04B 53/16
See application file for complete search history.

(56) References Cited

U.S. PATENT DOCUMENTS 7,152,583 B2 * 12/2006 Abe .................. F02M 63/0225 123/456
7,401,593 B2 * 7/2008 Rembold ........... F02M 63/0036 123/446

(Continued)

FOREIGN PATENT DOCUMENTS

DE 102018221702 A1 * 6/2020 ............. F02M 59/46
EP 2 344 749 B1 7/2011

(Continued)

OTHER PUBLICATIONS

English Machine Translation of DE102018221702 (Year: 2020).*

(Continued)

*Primary Examiner* — Nathan C Zollinger
(74) *Attorney, Agent, or Firm* — Maginot, Moore & Beck LLP

(57) ABSTRACT

A high-pressure fuel pump has a pressure-limiting valve, which fluidically connects a high-pressure region to a low-pressure region and opens towards the low-pressure region. The pressure-limiting valve is disposed in a pressure-limiting valve bore, which is designed as a through bore through the pump body, extends from a damping region to a stepped chamber, and is closed on the side facing the damping region by a pressed-in closure. The pressure-limiting valve bore is a stepped bore having a larger diameter first portion, a smaller diameter second portion, and an annular step between the first and second portions The pressure-limiting valve has a valve seat body pressed into the pressure-limiting valve bore, and a valve element, which is pushed in (Continued)

the closing direction by a holding element, which is pushed in the closing direction by a spiral spring, which is supported on the annular step.

13 Claims, 7 Drawing Sheets

(56) References Cited

U.S. PATENT DOCUMENTS

| | | | | |
|---|---|---|---|---|
| 8,070,462 | B2 * | 12/2011 | Inoue | F02M 63/005 417/454 |
| 10,876,509 | B2 * | 12/2020 | Han | F02M 59/46 |
| 2006/0222538 | A1 * | 10/2006 | Inoue | F02M 59/447 417/470 |
| 2007/0286742 | A1 | 12/2007 | Inoue | |
| 2008/0056914 | A1 | 3/2008 | Usui et al. | |
| 2011/0315909 | A1 * | 12/2011 | Oikawa | F02M 59/447 251/336 |
| 2017/0298886 | A1 * | 10/2017 | Lee | F02M 63/0054 |

FOREIGN PATENT DOCUMENTS

| | | | | |
|---|---|---|---|---|
| EP | 2434137 | A1 * | 3/2012 | F02M 59/20 |
| JP | 2020-128700 | A | 8/2020 | |
| WO | 2006/069819 | A1 | 7/2006 | |
| WO | 2019/015862 | A1 | 1/2019 | |
| WO | WO-2019121224 | A1 * | 6/2019 | F02M 59/025 |
| WO | 2020/120075 | A1 | 6/2020 | |

OTHER PUBLICATIONS

International Search Report corresponding to PCT Application No. PCT/EP2022/065631, mailed Sep. 1, 2022 (German and English language document) (6 pages).

* cited by examiner

HIGH-PRESSURE FUEL PUMP WITH PRESSURE LIMITING VALVE ARRANGEMENT

This application is a 35 U.S.C. § 371 National Stage Application of PCT/EP2022/065631, filed on Jun. 9, 2022, which claims the benefit of priority to Serial No. DE 10 2021 208 117.7, filed on Jul. 28, 2021 in Germany, the disclosures of which are incorporated herein by reference in their entirety.

BACKGROUND

A high-pressure fuel pump is already known from the prior art, for example from DE 10 2018 221 702 A1 of the applicant, with an inlet for supplying fuel, with an outlet for discharging compressed fuel, with a pump housing, with a delivery chamber disposed in the pump housing, with a pump piston which can be displaced in the pump housing along a longitudinal direction and which delimits the delivery chamber, with an inlet valve disposed between the inlet and the delivery chamber and which opens towards the delivery chamber, with an outlet valve which is disposed between the delivery chamber and the outlet and which opens away from the delivery chamber, with a high-pressure region which extends fluidically between the outlet valve and the outlet, with a low-pressure region which extends fluidically between the inlet and the inlet valve, and with a pressure-limiting valve which fluidically connects the high-pressure region to the low-pressure region and opens towards the low-pressure region, so that fuel flows out of the high-pressure region into the low-pressure region when the pressure difference between fuel in the high-pressure region and fuel in the low-pressure region exceeds an opening pressure.

In the pump disclosed in the prior art mentioned at the beginning, it is further provided that the pump piston is designed as a stepped piston, with a first portion which points towards the delivery chamber and has a larger diameter, and with a second portion which has a smaller diameter and points away from the delivery chamber, wherein a high-pressure seal is disposed between the first portion and the pump housing, in which the pump piston can be displaced and which separates the delivery chamber from the low-pressure region, a low-pressure seal being disposed between the second portion and a seal carrier fixed to the pump housing, whose seal separates the low-pressure region from the space outside the high-pressure fuel pump, a stepped chamber of the low-pressure region being located between the seal carrier and the pump housing, wherein the pressure-limiting valve fluidically connects the high-pressure region with the stepped chamber of the low-pressure region and opens towards the stepped chamber, so that fuel flows out of the high-pressure region into the stepped chamber when the pressure difference between fuel in the high-pressure region and fuel in the low-pressure region exceeds an opening pressure, wherein the pump housing comprises a pump body and a pump cover, which are connected to one another, wherein a damping region belonging to the low-pressure region, in which at least one diaphragm damper is disposed, is delimited by the pump body and the pump cover.

In the pump disclosed in the prior art mentioned at the beginning, it is further provided that the pressure-limiting valve has a valve seat body which is pressed into the pressure-limiting valve bore and on which a conical valve seat is formed, wherein the pressure-limiting valve has a valve element which has the shape of a ball and which comes into sealing contact with the valve seat, wherein the valve element is pressed in the closing direction by a holding element, wherein the holding element is pressed in the closing direction by a spiral spring.

In the pump disclosed in the prior art mentioned at the beginning, it is further provided that the pressure-limiting valve is disposed in a pressure-limiting valve bore formed as a blind bore in the pump body, which extends from the stepped chamber, and that the spiral spring is supported on a separate part pressed into the pressure-limiting valve bore.

SUMMARY

The disclosure is based on the desire to make the high-pressure fuel pump simple and efficient to manufacture.

The realization of the pressure-limiting valve bore as a blind hole in the pump body, which starts from the stepped chamber, has proven to be disadvantageous in that a separate part through which flow can pass is required, which must be pressed into the pressure-limiting valve bore in a separate assembly step during the assembly of the pressure-limiting valve in order to support the spiral spring, wherein the closing force generated in the spiral spring and acting on the valve element or the valve seat must define the opening pressure of the pressure-limiting valve, i.e. it must be possible to set it quite precisely.

The solution according to the disclosure, however, differs from the previously known solution in that the pressure-limiting valve is disposed in a pressure-limiting valve bore formed as a through bore through the pump body, wherein the pressure-limiting valve bore extends from the damping region to the stepped chamber and is closed on the side facing the damping region by a ball pressed into the pressure-limiting valve bore or a plug pressed into the pressure-limiting valve bore; and in that the pressure-limiting valve bore is designed as a stepped bore, with a first portion, which has a larger diameter and points towards the damping region, and a second portion, which has a smaller diameter and points towards the stepped chamber, and with an annular step formed between the first portion and the second portion, on which the spiral spring is supported.

The pressure-limiting valve of the pump according to the disclosure can be mounted in a simple and efficient manner from the side of the pump housing facing the damping chamber, preferably with the spiral spring at the front, so that it comes into contact with the annular step. Once the pressure-limiting valve has been installed in the pressure-limiting valve bore, the latter can be easily closed on the side facing the damping region by pressing in a ball or plug.

In a further development, it is provided that the outlet valve is disposed in an outlet valve bore of the pump housing, wherein the outlet valve bore and the pressure-limiting valve bore intersect, in particular at right angles. In this way, the pressure-limiting valve can be integrated into the high-pressure region without an additional high-pressure sealing point and in a space-saving manner.

It is particularly space-saving to provide that the outlet valve has a movable valve element and has a sealing seat part disposed upstream of the valve element, which is fixed with respect to the pump with a sealing seat part fixing portion, and on which a sealing seat cooperating with the valve element is formed, and a pump-fixed counter plate disposed downstream of the valve element, which is fixed in a pump-fixed manner with a counter plate fixing portion and which limits the mobility of the valve element in the downstream direction, wherein the pressure-limiting valve bore intersects the outlet valve bore between the seal seat part fixing portion and the counter plate fixing portion. The pressure-limiting valve bore then intersects the space in which the components belonging to the outlet valve are mounted, so that this space is used for two purposes.

Furthermore, it can be provided that an outlet port chamber is formed between the pump housing and the outlet port. On the one hand, the outlet port chamber can consist of or comprise the part of the interior of the port facing the pump housing. The outlet port chamber can also comprise a recess in the pump body covered by the outlet port, and in particular consist of these two partial chambers. Alternatively, the outlet port chamber can consist of the recess in the pump body covered by the outlet port.

It can be provided that the outlet is formed as an outlet port fixed to the pump housing and an outlet port chamber is formed between the pump housing and the outlet port, wherein the outlet valve is fixed in an outlet valve bore of the pump housing, wherein the outlet valve bore extends from the outlet port chamber, wherein the pressure-limiting valve bore is connected to the outlet port chamber via a high-pressure connection bore located in the high-pressure region and extending from the outlet port chamber. In this case, the flexibility of the arrangement of the pressure-limiting valve bore in the pump body is increased compared to the solution described above.

If the outlet valve bore and the high-pressure connection bore are disposed parallel to each other, for example perpendicular to the longitudinal direction, they can be easily produced, for example with the same tool or together.

If the outlet valve bore and the high-pressure connection bore are disposed at an angle to each other that is different from 0° and, for example, perpendicular to the longitudinal direction, the installation space available in the pump body for internal contours can be used optimally—or the pump body can potentially be further reduced in size.

It can always be provided that an imaginary (possibly elongated) central axis of the outlet valve bore intersects an imaginary (possibly elongated) central axis of the pump piston, i.e. the longitudinal axis. The fuel can then flow out of the delivery chamber and through the outlet valve without any further deflection and therefore with particularly low friction.

On the other hand, for reasons of optimum utilization of the installation space available in the pump body, it can also be advantageous if an imaginary (possibly extended) central axis of the outlet valve bore does not intersect an imaginary (possibly extended) central axis of the pump piston, i.e. the longitudinal axis.

In a first further object claimed in the present case, a high-pressure fuel pump for a fuel system is provided, having an inlet for supplying fuel, having an outlet for dispensing compressed fuel, having a pump housing, a delivery chamber disposed in the pump housing, with a pump piston which can be displaced in the pump housing along a longitudinal direction, limiting the delivery chamber, having an inlet valve disposed between the inlet and the delivery chamber, which opens towards the delivery chamber, having an outlet valve disposed between the delivery chamber and the outlet, which opens away from the delivery chamber, having a high pressure region, which is fluidly extending between the outlet valve and the outlet, having a low pressure region, which fluidly extends between the inlet and the inlet valve, and having a pressure-limiting valve, fluidly connecting the high-pressure region to the low-pressure region and opening toward the low-pressure region, such that fuel drains from the high-pressure region to the low-pressure region, if the pressure difference between the fuel in the high pressure region and the fuel in the low pressure region exceeds an opening pressure, wherein the pump piston is formed as a stepped piston, having a first portion, facing towards the delivery chamber and having a larger diameter, and having a second portion, having a smaller diameter and facing away from the delivery chamber, wherein a high-pressure seal is disposed between the first portion and the pump housing, in which the pump piston can be displaced, and separating the delivery chamber from the low-pressure region, wherein a low-pressure seal is disposed between the second portion, and a seal carrier fixed to the pump housing, separating the low-pressure region from the space outside the high-pressure fuel pump, wherein a stepped chamber of the low pressure region is disposed between the seal carrier and the pump housing, wherein the pressure-limiting valve fluidly connects the high-pressure region to the stepped chamber of the low-pressure region and opens toward the stepped chamber, such that fuel drains from the high-pressure region into the stepped chamber, if the pressure difference between the fuel in the high-pressure region and the fuel in the low-pressure region exceeds an opening pressure, wherein the outlet valve is disposed in an outlet valve bore of the pump housing and has a movable valve element and a sealing seat part disposed upstream of the valve element, which is fixed with respect to the pump with a sealing seat part fixing portion, and on which a sealing seat cooperating with the valve element is formed, and a fixed with respect to the pump counter plate disposed downstream of the valve element, which is fixed with respect to the pump with a counter plate fixing portion and which prevents the mobility of the valve element in the downstream direction, wherein the pressure-limiting valve is disposed in a pressure-limiting valve bore in the pump housing, which extends in the longitudinal direction and, starting from the stepped chamber, opens into the outlet valve bore, namely between the sealing seat part fixing portion and the counter plate fixing portion.

Compared to the prior art cited at the beginning and in particular due to the arrangement in which the pressure-limiting valve bore opens into the outlet valve bore between the seal seat fixing portion and the counterplate fixing portion, the advantage is that the pressure-limiting valve can be integrated into the high-pressure region without an additional high-pressure sealing point and in a space-saving manner. The space in which the components belonging to the outlet valve are mounted is also the orifice area of the pressure-limiting valve bore, so it is used for two purposes.

The first further embodiment can advantageously be further formed, preferably with the features disclosed in FIG. 6 and/or in the description referring thereto.

In a second further embodiment, a high-pressure fuel pump for a fuel system is provided, having an inlet for supplying fuel, having an outlet for dispensing compressed fuel, having a pump housing, a delivery chamber disposed in the pump housing, with a pump piston which can be displaced in the pump housing along a longitudinal direction, limiting the delivery chamber, having an inlet valve disposed between the inlet and the delivery chamber, which opens towards the delivery chamber, having an outlet valve disposed between the delivery chamber and the outlet, which opens away from the delivery chamber, having a high pressure region, which is fluidly extending between the outlet valve and the outlet, having a low pressure region, which fluidly extends between the inlet and the inlet valve, and having a pressure-limiting valve, fluidly connecting the high-pressure region to the low-pressure region and opening toward the low-pressure region, such that fuel drains from the high-pressure region to the low-pressure region, if the pressure difference between the fuel in the high pressure region and the fuel in the low pressure region exceeds an opening pressure, wherein the pump piston is formed as a stepped piston, having a first portion, facing towards the delivery chamber and having a larger diameter, and having a second portion, having a smaller diameter and facing away from the delivery chamber, wherein a high-pressure seal is disposed between the first portion and the pump housing, in which the pump piston can be displaced, and separating the delivery chamber from the low-pressure region, wherein a low-pressure seal is disposed between the second portion, and a seal carrier fixed to the pump housing, separating the low-pressure region from the space outside the high-pressure fuel pump, wherein a stepped chamber of the low pressure region is disposed between the seal carrier and the pump housing, wherein the pressure-limiting valve fluidly connects the high-pressure region to the stepped chamber of the low-pressure region and opens toward the stepped chamber, such that fuel drains from the high-pressure region into the stepped chamber, if the pressure difference between the fuel in the high-pressure region and the fuel in the low-pressure region exceeds an opening pressure, wherein the outlet valve is disposed in an outlet valve bore of the pump housing, wherein the pressure-limiting valve is disposed in a pressure-limiting valve bore in the pump housing, which extends in the longitudinal direction and, starting from the stepped chamber, opens into a high-pressure connection bore in the pump housing, which is disposed in the high-pressure region and which is oriented at an angle other than 0° to the outlet valve bore, wherein, in particular, the outlet is formed as an outlet port fixed to the pump housing, wherein, in particular, an outlet port chamber is formed between the pump housing and the outlet port and wherein, in particular, the outlet valve bore and the high-pressure connecting bore both extend from the outlet port chamber.

Compared to the prior art cited at the beginning and in particular due to the arrangement in which the high-pressure connection bore is oriented at an angle other than 0° to the outlet valve bore, it is achieved that the installation space available in the pump body for internal contours can be optimally used—or the pump body can potentially be further reduced in size.

The second further article can be advantageously further formed, preferably with the feature that the outlet valve bore and the high-pressure connection bore both extend from the outlet port chamber. The bores can then be made in a simple manner, e.g. with the same tool.

The second further object can furthermore be advantageously further formed with the features disclosed in FIG. 7 and/or in the description referring thereto.

In the context of the present disclosure, a bore (in particular outlet valve bore, pressure-limiting valve bore, low-pressure connection bore, high-pressure connection bore, etc.) is understood to mean in particular an internal contour of the pump housing or the pump body, which can be machined from the outside into the pump housing or the pump body by a rotating twist drill. In particular, the bore has an axial symmetry whose axis of symmetry corresponds to the axis of rotation of the twist drill. This axis of symmetry then indicates the direction in which the bore is oriented. In principle, the bore can be a through bore through the pump housing or pump body or a blind bore that ends at a bore bottom disposed in the pump housing or pump body. In the context of the present disclosure, the exit of a bore is the side of the bore that is first created by machining when the drill bit penetrates the pump housing or pump body. For blind bores, this is always the side opposite the bottom of the bore. The mouth of a bore is therefore the side of the bore opposite the exit of a bore if the bore meets another inner contour of the pump housing or pump body or emerges from the pump housing or pump body. The bores of the present disclosure are free of undercuts, particularly when viewed from their exit.

In the context of the present disclosure, the bore wall in a through-bore is the inner contour represented by the through-bore; in a blind-bore, the bore wall is the portion of the inner contour represented by the through-bore that is not the bottom of the bore.

In the context of the present disclosure, the high-pressure region is understood to be the entire space that communicates with the outlet without further action, in particular without further intermediate valves, so that a uniform pressure is established in the high-pressure region, for example 500 bar when the pump is in operation.

In the context of the present disclosure, the low-pressure region is understood to be the entire space that communicates with the inlet without further, in particular without further intermediate valves, so that a uniform pressure is established in the low-pressure region, for example 5 bar during operation of the pump and with a low-pressure pump connected to the inlet.

In particular, the internal contours of the high-pressure fuel pump through which the fuel flows consist of the low-pressure region, the delivery chamber and the high-pressure region. These regions are separated from each other by the inlet valve, the outlet valve and the pressure-limiting valve.

The fuel can be a fuel such as gasoline, for example.

Where an angle other than 0° is referred to in the context of the disclosure, this can be an angle that is significantly different from 0°, for example at least 2° or at least 5°. For example, it can be an angle between 2° and 90°.

BRIEF DESCRIPTION OF THE DRAWINGS

Embodiment examples of the disclosure are explained below with reference to the drawing. The drawings show.

DETAILED DESCRIPTION

Figure 1:
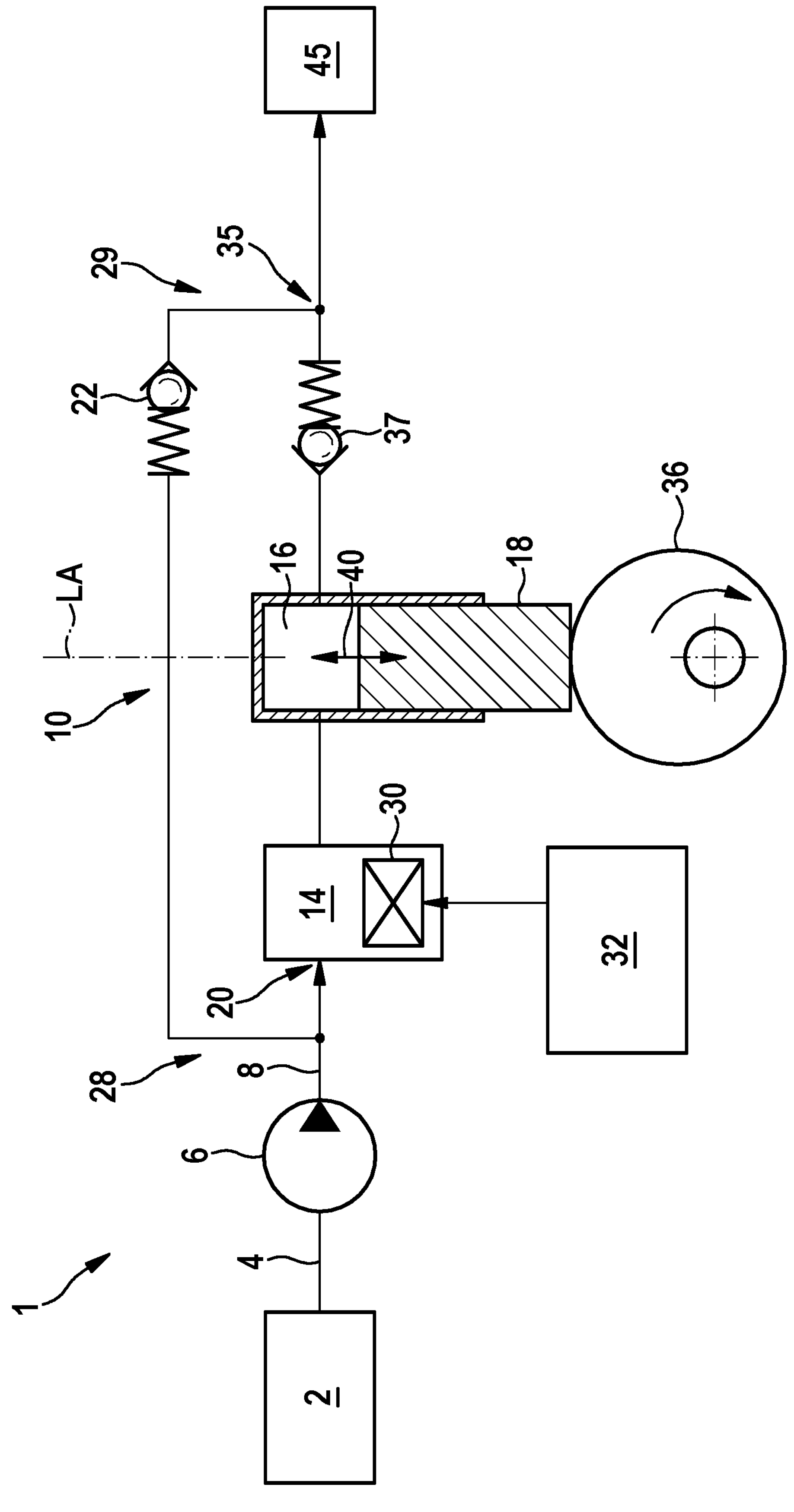
FIG. 1 shows a simplified schematic diagram of a fuel system for an internal combustion engine.

FIG. 1 shows a fuel system 1 for an internal combustion engine not shown in a simplified schematic diagram. During operation of the fuel system 1, fuel is fed from a fuel tank 2 via a suction line 4 by means of a pre-feed pump 6 and a low-pressure line 8 via an inlet port 20 to a high-pressure fuel pump 10 designed as a piston pump. An inlet valve 14 is fluidically arranged downstream of the inlet port 20. A low-pressure region 28 of the high-pressure fuel pump 10 is located fluidically between the inlet port 20 and the inlet valve 14. A delivery chamber 16 of the high-pressure fuel pump 10 is located downstream of the inlet valve 14. Pressure pulsations in the low-pressure region 28 can be damped by means of a pressure damping device. The inlet valve 14 can be forcibly opened via an actuating device designed here as an electromagnetic actuator 30. The actuating device and thus the inlet valve 14 can be controlled via a control unit 32.

A pump piston 18 of the high-pressure fuel pump 10 can be moved up and down along a longitudinal axis running in the longitudinal direction LA, to which the pump piston 18 is axially symmetrical, by means of a drive 36 designed in the present case as a cam disk, which is shown in FIG. 1 by a double arrow 40. An outlet valve 37 is disposed fluidically between the delivery chamber 16 and an outlet port 35 of the high-pressure fuel pump 10, which can open towards the outlet port 35 and a high-pressure accumulator 45 ("rail") located further downstream. As a result, a high-pressure region 29 of the high-pressure fuel pump 10 extends fluidically between the outlet valve 37 and the outlet port 35.

The high-pressure region 29 and the low-pressure region 28 are directly connected to each other via a pressure-limiting valve 22, which opens when a limit pressure is exceeded in the high-pressure region 29 of the high-pressure fuel pump 10 or in the high-pressure accumulator 45 communicating with it. The pressure-limiting valve 22 is designed as a spring-loaded check valve and can open towards the low-pressure region 28 of the high-pressure fuel pump 10. In this way, the pressure that can be generated by the high-pressure fuel pump 10 in the high-pressure accumulator 45 is limited.

Figure 2:
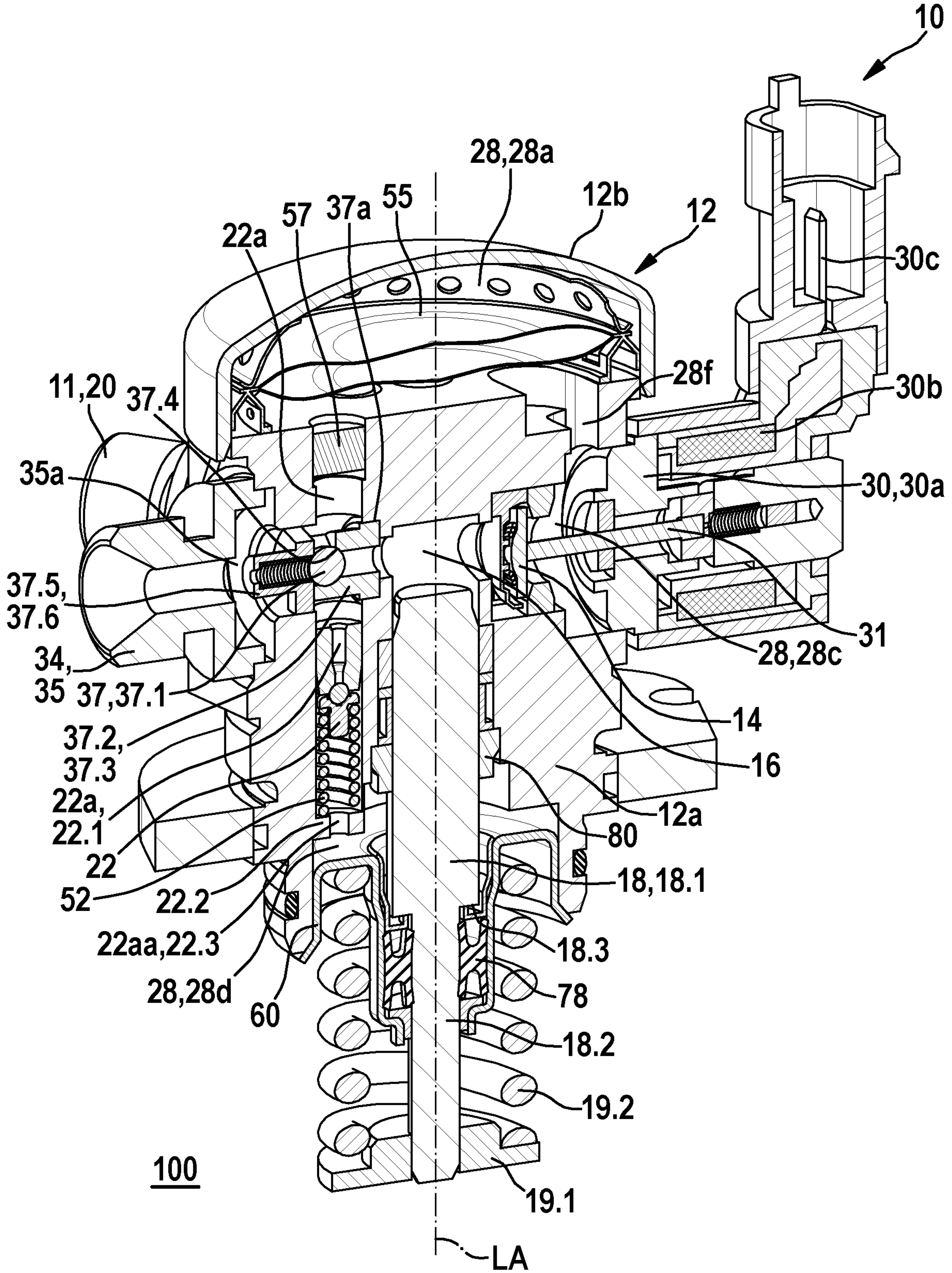
FIG. 2 shows a first embodiment example of the disclosure.

FIG. 2 shows a sectional view of a high-pressure fuel pump 10 as a first embodiment.

The high-pressure fuel pump 10 has an inlet 11 in the form of an inlet port 20. Without intermediate valves, the inlet 11 communicates with the entire low-pressure region 28 of the high-pressure fuel pump 10.

The high-pressure fuel pump 10 has an outlet 34 in the form of an outlet port 35. Without intermediate valves, the outlet 34 communicates with the entire high-pressure region 29 of the high-pressure fuel pump 10.

The outlet port 35 and the inlet port 20 are fixed to a pump housing 12, in which a delivery chamber 16 is also disposed, which is delimited by a pump piston 18 that can be displaced along a longitudinal direction LA.

The low-pressure region 28 comprises a damper chamber 28*a*, which is connected to the inlet 11 via a fluidic connection not visible in this cross-section and which is formed between a pump body 12*a* of the pump housing 12 and a pump cover 12*b* of the pump housing 12. A diaphragm damper 55 is disposed in the damping chamber 28*a*, which can have the shape of a flat and compressible can formed by two metal diaphragms.

The non-visible fluidic connection between the inlet 11 and the damper chamber 28*a* can, for example, comprise a filter bore in which a filter element is disposed which frees a fuel flowing through the filter bore from entrained solid particles above a minimum size.

A seal carrier 60 is attached to the lower portion of the pump body 12*a* in FIG. 2 and a stepped chamber 28*d* is formed between the pump body 12*a* and the seal carrier 60. The stepped chamber 28*d* communicates with the damping chamber 28*a* via a through bore through the pump body 12*a*, which is not visible in this cross-section, and is therefore part of the low-pressure region 28.

The delivery chamber 16 is limited towards the low-pressure region 28 by an inlet valve 14, which opens towards the delivery chamber 16 when there is a corresponding pressure difference.

In order to control the delivery rate of the high-pressure fuel pump 10, the inlet valve 14 can be forcibly opened by a tappet 31 driven by the actuator 30. For this purpose, the actuator 30 has an actuator housing 30*a* fixed to the pump housing 12, in which an electromagnetic coil 30*b* is disposed, which can be energized via an externally accessible electrical connection 30*c* of the high-pressure fuel pump 10.

Geometrically between the inlet valve 14 and the actuator 30, an inlet valve region 28*c* of the low-pressure region 28 is formed in the pump housing. It communicates with the damping region 28*a* via the bore 28*f* visible in this cross-section.

The delivery chamber 16 is limited towards the high-pressure region 29 by an outlet valve 37, which opens away from the delivery chamber 16 when there is a corresponding pressure difference. In this example, it is disposed in an outlet valve bore 37*a* of the pump housing 12 or the pump body 12*a*. It has a movable valve element 37.1, which interacts with a sealing seat 37.4, which is formed on a sealing seat part 37.2 disposed upstream of the valve element 37.1 and fixed to the pump. The movement of the valve element 37.1 in the downstream direction is limited by a counter plate 37.5 that is fixed to the pump. The outlet valve bore 37*a* extends from an outlet port chamber 35*a* located between the outlet port 35 and the pump housing 12 or the pump body 12*a*.

The pump piston 18 is designed as a stepped piston. It has a first portion 18.1 pointing towards the delivery chamber 16 with a larger diameter and a second portion 18.2 pointing away from the delivery chamber with a smaller diameter (relative to the diameter of the first portion 18.1). Between the first and second portions 18.1, 18.2, an annular step 18.3 is formed, pointing vertically downwards in FIG. 2.

A high-pressure seal 80 is disposed between the first portion 18.1 and the pump housing 12, in which the pump piston 18 can be displaced. The high-pressure seal 80 separates the delivery chamber 16 from the low-pressure region 28.

The high-pressure seal 80 can, for example, be a separate sealing ring, e.g. made of metal or plastic, for example as explained in more detail in WO 19 015 862 A1 of the applicant. On the other hand, the high-pressure seal 80 can also be a narrow gap extending over a certain length between the pump piston 18 and a bushing or between the pump piston 18 and the pump housing 12, for example as explained in more detail in WO 06 069 819 A1 of the applicant.

A low-pressure seal 78 is disposed between the second portion 18.2 and the seal carrier 60 already mentioned above, which separates the stepped chamber 28*d* of the low-pressure region 28 from the space 100, which is located outside the high-pressure fuel pump 10. The pump piston 18 can be displaced in the low-pressure seal 78.

The pump piston 18 is pretensioned in the longitudinal direction LA, which is pointing downwards in FIG. 2, by means of a spring plate 19.1 fixed to the pump piston 18 and a pump spring 19.2 clamped between the spring plate 19.1 and the seal carrier 60.

The high-pressure fuel pump 10 according to the disclosure has a pressure-limiting valve 22 which fluidically connects the high-pressure region 29 to the low-pressure region 28 and opens towards the low-pressure region 28, so that fuel flows out of the high-pressure region 29 into the low-pressure region 28 when the pressure difference between fuel in the high-pressure region 29 and fuel in the low-pressure region 28 exceeds an opening pressure.

Figure 3:
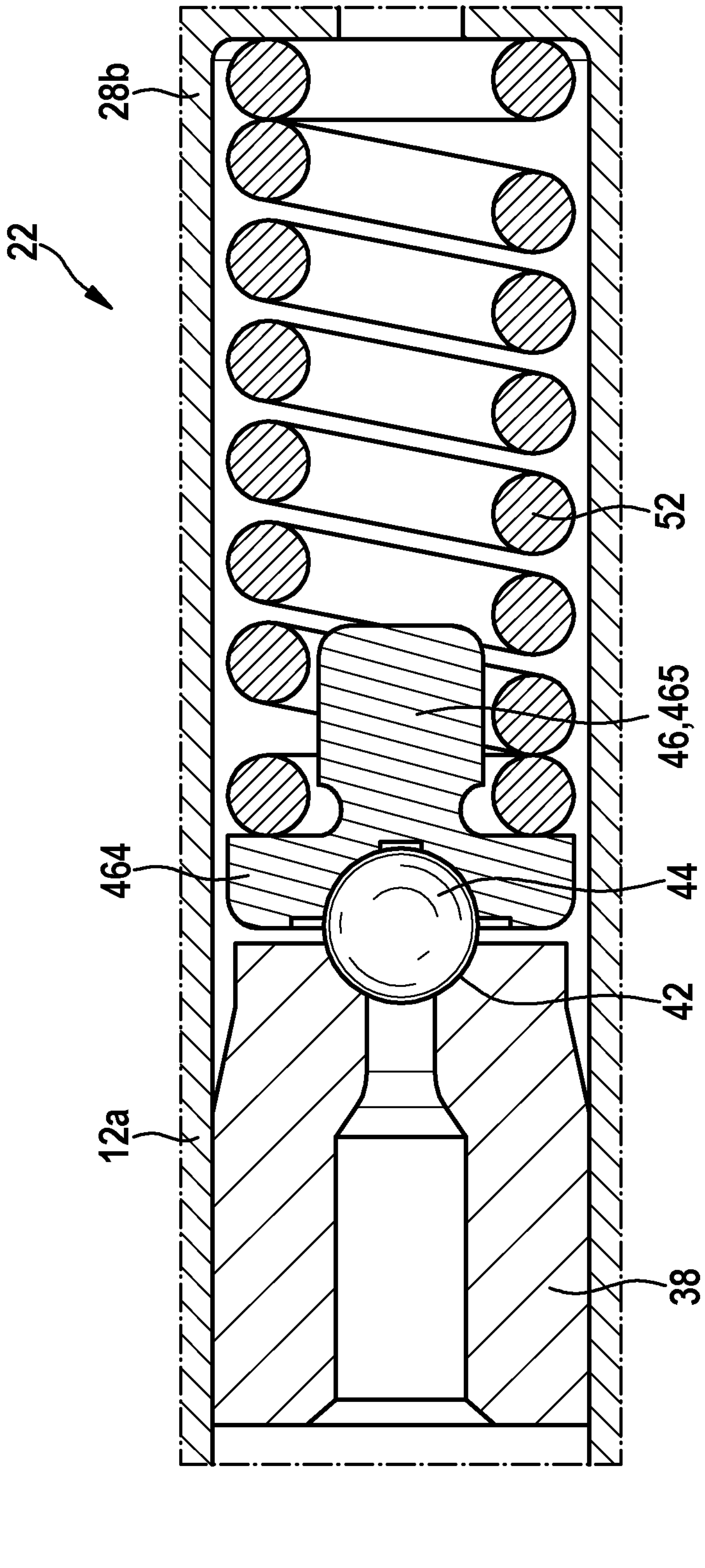
FIG. 3 shows a detailed example of a pressure-limiting valve as it can be used in the embodiment examples shown.

The pressure-limiting valve is shown in detail and by way of example in FIG. 3. It has a valve seat body 38 pressed into the pressure-limiting valve bore 22*a* or into a housing of the pressure-limiting valve 22, on which a tapered valve seat 42 is formed. The pressure-limiting valve 22 also has a valve element 44, which has the shape of a ball and which comes into sealing contact with the valve seat 42. The valve element 44 is pressed in the closing direction by a holding element 46 and the holding element 46 is pressed in the closing direction by a spiral spring 52. The spiral spring 52 is supported on a housing of the pressure-limiting valve 22 or directly on the pump housing 12. The spiral spring 52 is in contact with a radially outer region 464 of the holding element 46. A radially inner region 465 of the holding element 46 is accommodated by the spiral spring 52. The opening pressure of the pressure-limiting valve 22 is defined by the stiffness of the spiral spring 52 and by the effective area at the pressure-limiting valve 22, and thus also the maximum pressure difference that the high-pressure fuel pump 10 is able to generate between its inlet 11 and its outlet 34.

The arrangement of the pressure-limiting valve 22 in the high-pressure fuel pump 10 according to the disclosure will now be discussed further by way of example.

In the context of the disclosure, it is provided that the pressure-limiting valve 22 fluidically connects the high-pressure region 29 to the stepped chamber 28*d* of the low-pressure region 28 and opens towards the stepped chamber 28*d*, so that fuel flows out of the high-pressure region 29 into the stepped chamber 28*d* when the pressure difference between fuel in the high-pressure region 29 and fuel in the low-pressure region 28 exceeds an opening pressure, and in that the pressure-limiting valve 22 is disposed in a pressure-limiting valve bore 22*a* formed as a through bore through the pump body 12*b*, wherein the pressure-limiting valve bore 22*a* extends from the damping region 28*a* to the stepped chamber 28*d* and is closed on the side facing the damping region 28*a* by a ball 56 pressed into the pressure-limiting valve bore 22*a* or a plug 57 pressed into the pressure-limiting valve bore 22*a*, wherein the pressure-limiting valve bore 22*a* is designed as a stepped bore, with a first portion 22.1, which has a larger diameter and points towards the damping region 28*a*, and a second portion 22.3, which has a smaller diameter and points towards the stepped chamber 28*d*, and with an annular step 22.2 formed between the first portion 22.1 and the second portion 22.3, and in that the above-mentioned spiral spring 52 of the pressure-limiting valve 22 is supported on the annular step 22.2 of the pressure-limiting valve bore 22*a*.

According to the first embodiment example (FIGS. 2 and 3), it is further provided that the outlet valve bore 37*a* and the pressure-limiting valve bore 22*a* intersect, in particular at right angles. In this example, the cut is made within the high-pressure region 29.

More precisely, the cut according to the first embodiment example of the invention is made such that the sealing seat part 37.2 is fixed with respect to the pump with a sealing seat part fixing portion 37.3 and that the counter plate 37.5 is fixed with respect to the pump with a counter plate fixing portion 37.6 and that the pressure-limiting valve bore 22*a* intersects the outlet valve bore 37*a* between the sealing seat part fixing portion 37.3 and the counter plate fixing portion 37.6.

In the example, it is provided that an imaginary central axis of the outlet valve bore 37*a* intersects an imaginary central axis of the pump piston 18, i.e. the longitudinal axis of the high-pressure fuel pump.

Figure 4B:
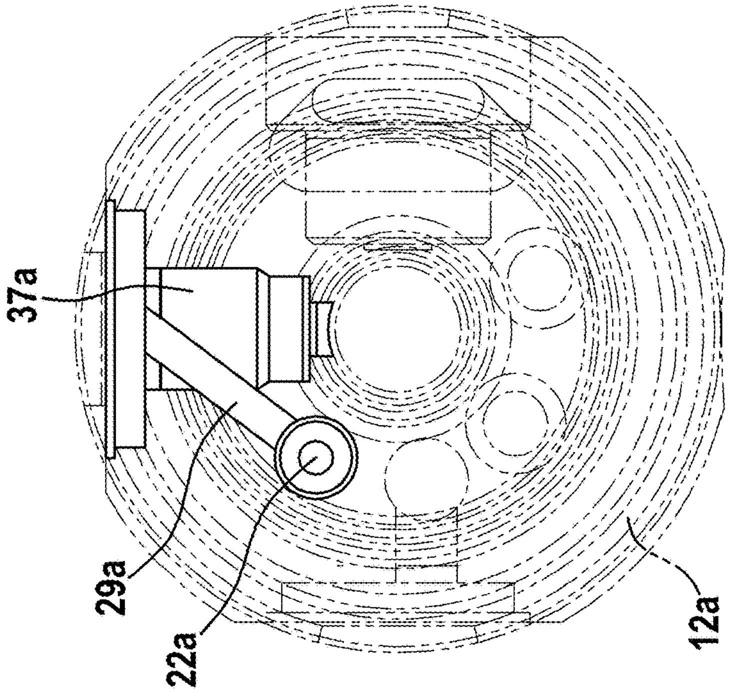
FIG. 4 shows a second embodiment example of the disclosure.
Figure 4A:
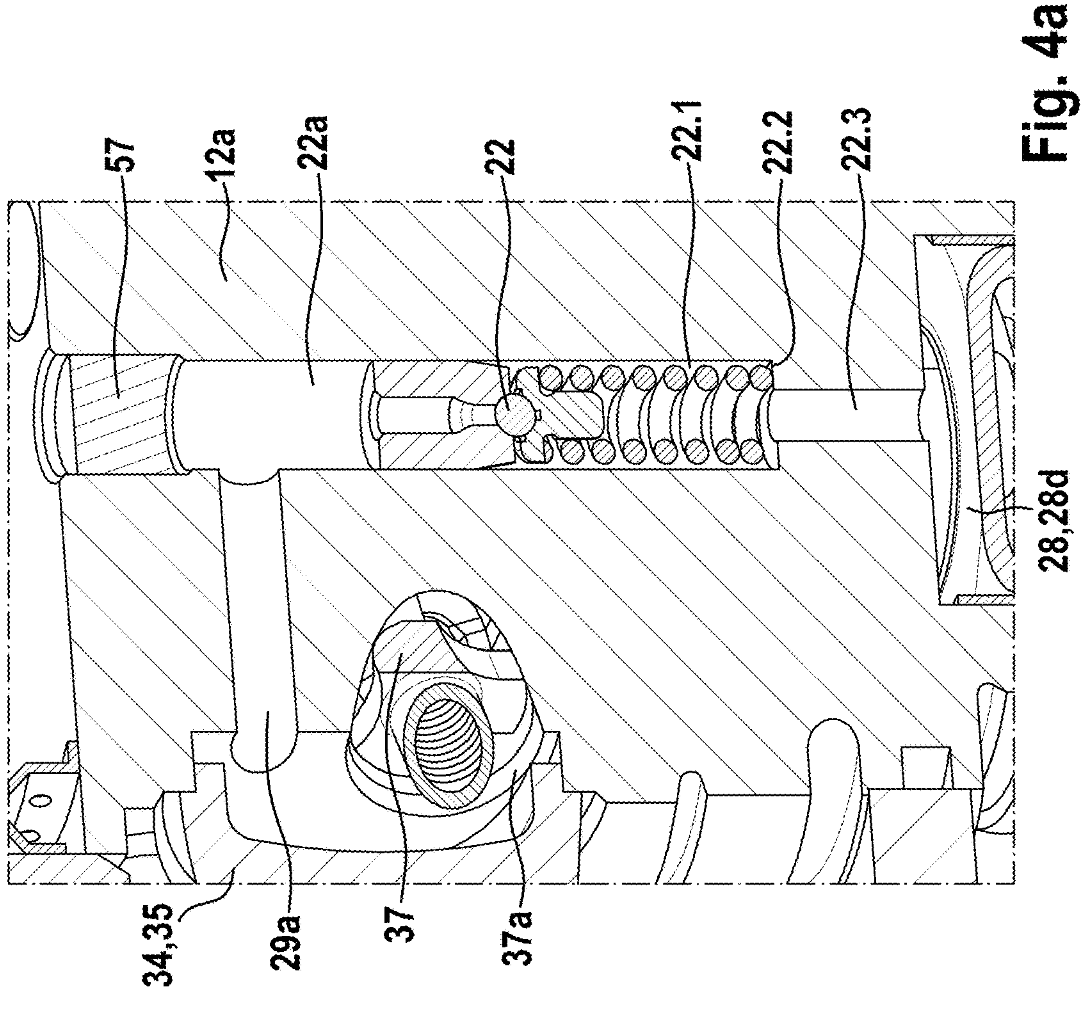

A second embodiment example is shown in FIG. 4 in part a) as a sectional view and in part b) as a top view of the semi-transparent pump body 12*a*. The second embodiment example differs from the first embodiment example in that it is not provided that the outlet valve bore 37*a* and the pressure-limiting valve bore 22*a* intersect. Instead, in the second embodiment example, it is provided that the pressure-limiting valve bore 22*a* is connected to the outlet port chamber 35*a* via a high-pressure connecting bore 29*a* located in the high-pressure region 29 and extending from the outlet port chamber 35*a*.

The outlet valve bore 37*a* and the high-pressure connection bore 29*a* are disposed at an angle different from 0°, in particular at an angle of at least 20°, relative to each other and in each case perpendicular to the longitudinal direction LA.

In particular, an imaginary central axis of the outlet valve bore 37*a* intersects an imaginary central axis of the pump piston 18.

Figure 5B:
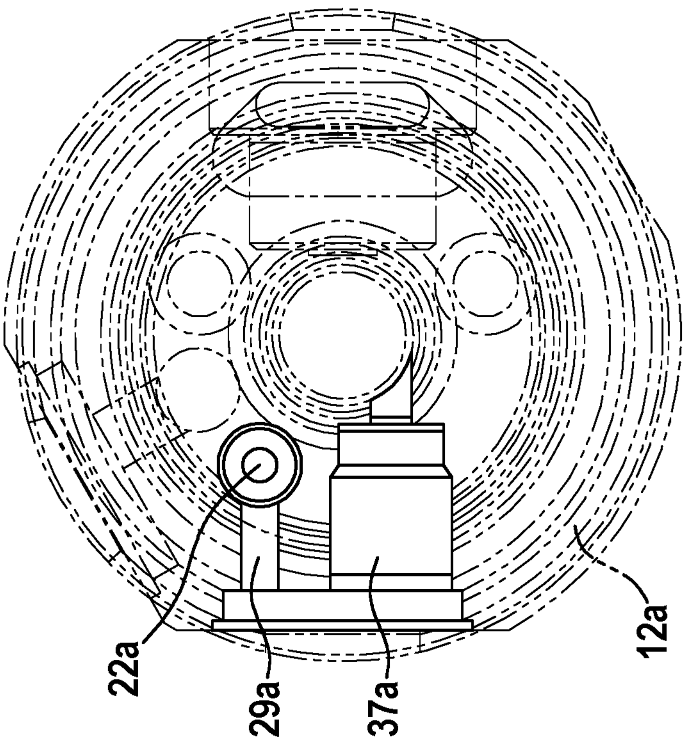
FIG. 5 shows a third embodiment example of the disclosure.
Figure 5A:
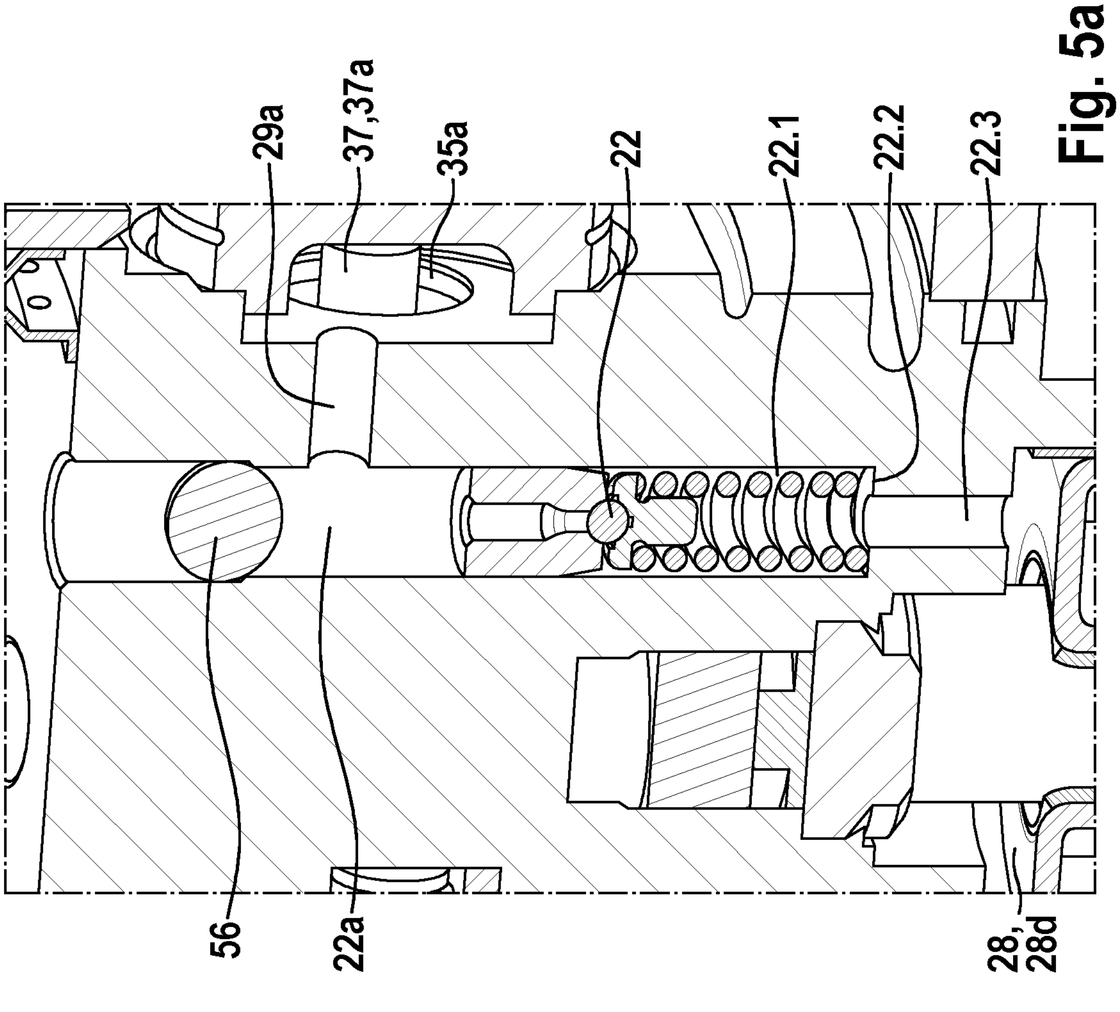

A third embodiment example is shown in FIG. 5 in part a) as a sectional view and in part b) as a top view of the semi-transparent pump body 12*a*. The third embodiment example differs from the second embodiment example in that the outlet valve bore 37*a* and the high-pressure connection bore 29*a* are disposed parallel to each other.

In the example, these two bores 22*a*, 37*a* are disposed perpendicular to the longitudinal direction LA. An imaginary central axis of the outlet valve bore 37*a* does not or does not necessarily intersect an imaginary central axis of the pump piston 18.

Figure 6:
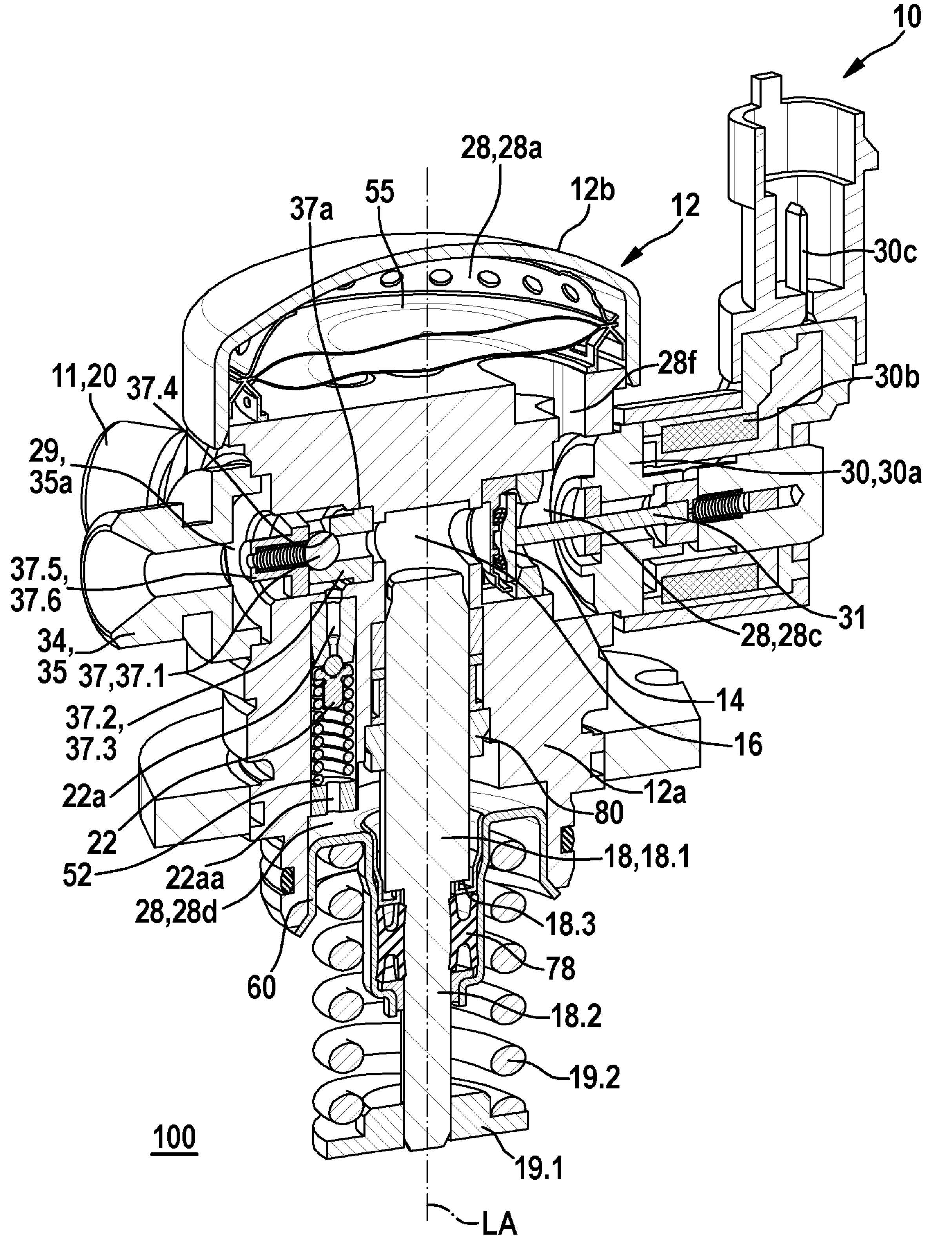
FIG. 6 shows a fourth embodiment example of the disclosure.

A fourth embodiment example of the invention is designed according to the first secondary claim and is shown in a sectional view in FIG. 6. This is a high-pressure fuel pump 10 for a fuel system for an internal combustion engine, having an inlet 11 for supplying fuel, having an outlet 34 for dispensing compressed fuel, having a pump housing 12, a delivery chamber 16 disposed in the pump housing, with a pump piston 18 which can be displaced in the pump housing 12 along a longitudinal direction LA, limiting the delivery chamber, having an inlet valve 14 disposed between the inlet 11 and the delivery chamber 16, which opens towards the delivery chamber 16, having an outlet valve 37 disposed between the delivery chamber 16 and the outlet 34, which opens away from the delivery chamber 16, having a high pressure region 29, which is fluidly extending between the outlet valve 20 and the outlet 34, having a low pressure region 28, which fluidly extends between the inlet 11 and the inlet valve 14, and having a pressure-limiting valve 22, fluidly connecting the high-pressure region 29 to the low-pressure region 28 and opening toward the low-pressure region 28, such that fuel drains from the high-pressure region 29 to the low-pressure region 28, if the pressure difference between the fuel in the high pressure region 29 and the fuel in the low-pressure region 28 exceeds an opening pressure, wherein the pump piston 18 is formed as a stepped piston, having a first portion 18.1, facing towards the delivery chamber 16 and having a larger diameter, and having a second portion 18.2, having a smaller diameter and facing away from the delivery chamber 16, wherein a high-pressure seal 80 is disposed between the first portion 18.1 and the pump housing 12, in which the pump piston 18 can be displaced, and separating the delivery chamber 16 from the low-pressure region 28, wherein a low-pressure seal 78 is disposed between the second portion 18.2, and a seal carrier 60 fixed to the pump housing 12, separating the low-pressure region 28 from the space 100 outside the high-pressure fuel pump 10, wherein a stepped chamber **28*d* of the low-pressure region 28 is disposed between the seal carrier 60 and the pump housing 12, wherein the pressure-limiting valve 22 fluidly connects the high-pressure region 29 to the stepped chamber 28*d* of the low-pressure region and opens toward the stepped chamber 28*d*, such that fuel drains from the high-pressure region 29 into the stepped chamber 28*d*, if the pressure difference between the fuel in the high-pressure region 29 and the fuel in the low-pressure region 28 exceeds an opening pressure, wherein the outlet valve 37 is disposed in an outlet valve bore 37*a* of the pump housing 12 and has a movable valve element 37.1 and a sealing seat part 37.2 disposed upstream of the valve element 37.1, which is fixed with respect to the pump with a sealing seat part fixing portion 37.3, and on which a sealing seat 37.4 cooperating with the valve element 37.1 is formed, and a fixed with respect to the pump counter plate 37.5 disposed downstream of the valve element 37.1, which is fixed with respect to the pump with a counter plate fixing portion 37.5 and which prevents the mobility of the valve element 37.1 in the downstream direction, wherein the pressure-limiting valve 37 is disposed in a pressure-limiting valve bore 37 in the pump housing 12, which extends in the longitudinal direction LA and, starting from the stepped chamber 28*d*, opens into the outlet valve bore 22*a*, namely between the sealing seat part fixing portion 37.3 and the counter plate fixing portion 37.6**.

Figure 7B:
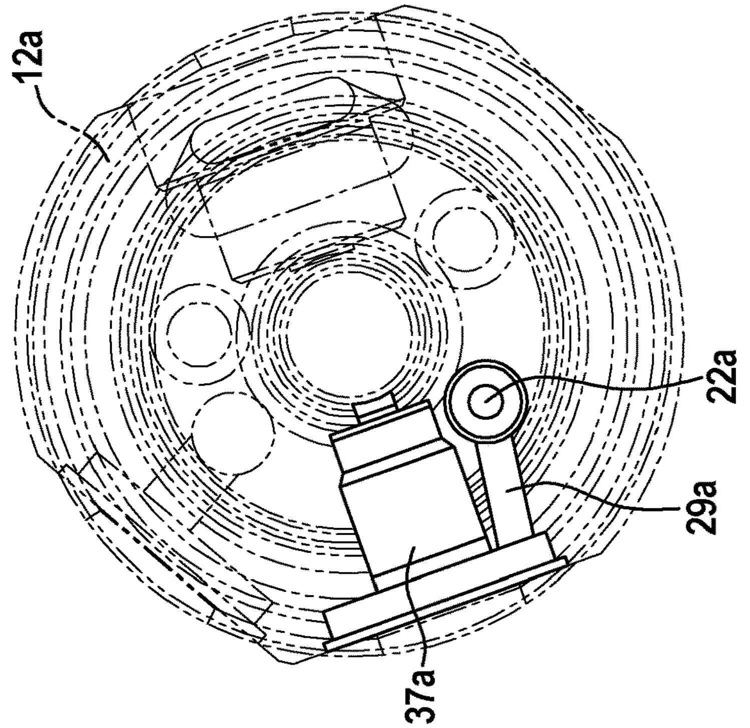
FIG. 7 shows a fifth embodiment example of the disclosure.
Figure 7A:
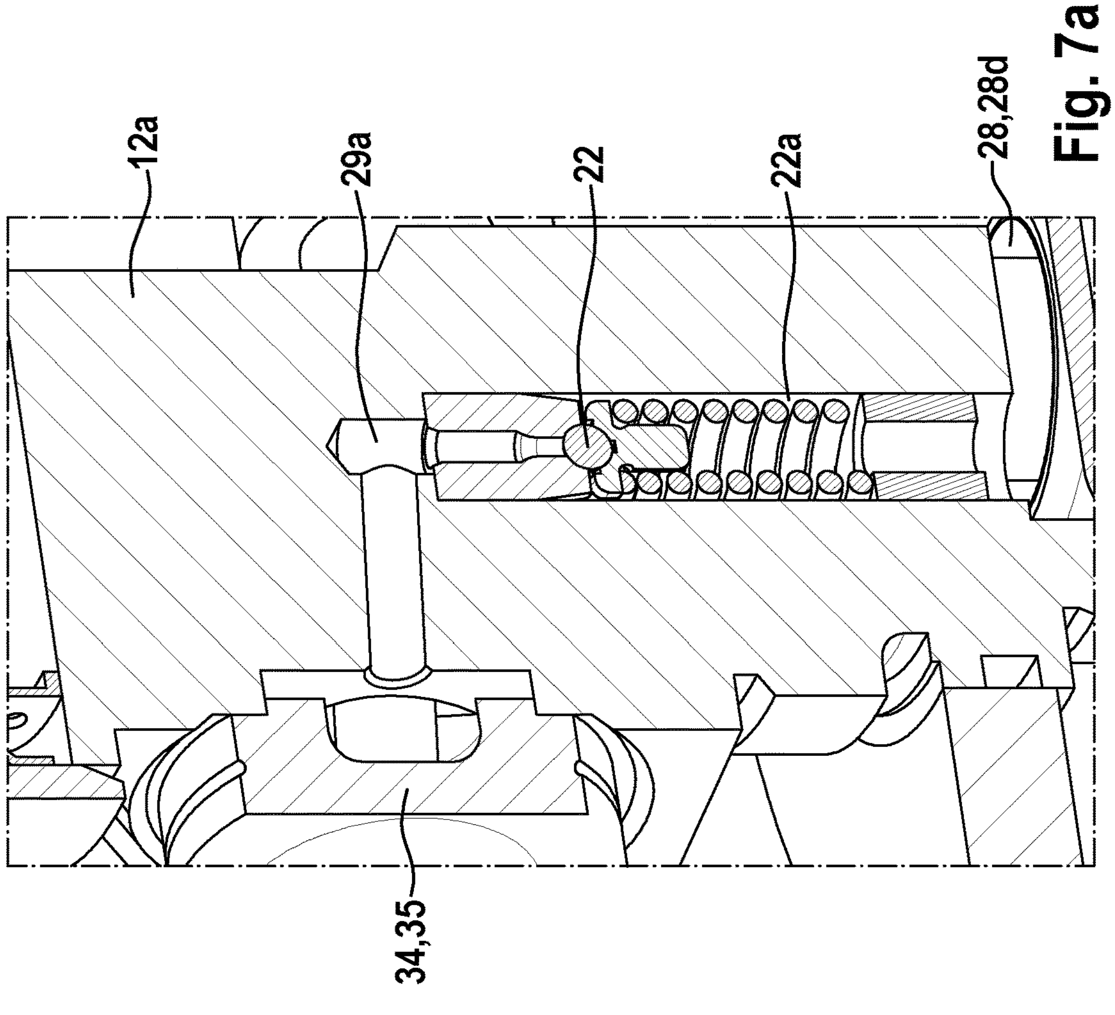

A fifth embodiment example is shown in FIG. 7 in part a) in a sectional view and in part b) by means of a top view of the pump body **12*a* shown semi-transparent. This is a high-pressure fuel pump 10 for a fuel system for an internal combustion engine, with an inlet 11 for supplying fuel, with an outlet 34 for discharging compressed fuel, with a pump housing 12, with a delivery chamber 16 disposed in the pump housing, with a pump piston 18 which can be displaced in the pump housing 12 along a longitudinal direction LA and which delimits the delivery chamber, with an inlet valve 14, which is disposed between the inlet 11 and the delivery chamber 16 and opens towards the delivery chamber 16, with an outlet valve 37, which is disposed between the delivery chamber 16 and the outlet 34 and opens away from the delivery chamber 16, with a high-pressure region 29, which extends fluidically between the outlet valve 20 and the outlet 34, with a low-pressure region 28, which extends fluidically between the inlet 11 and the inlet valve 14, and with a pressure-limiting valve 22, which fluidically connects the high-pressure region 29 to the low-pressure region 28 and opens towards the low-pressure region 28, so that fuel flows out of the high-pressure region 29 into the low-pressure region 28 when the pressure difference between fuel in the high-pressure region 29 and fuel in the low-pressure region 28 exceeds an opening pressure, the pump piston 18 being designed as a stepped piston, with a first portion 18.1, which points towards the delivery chamber 16 and has a larger diameter, and with a second portion 18. 2, which has a smaller diameter and faces away from the delivery chamber 16, a high-pressure seal 80 being disposed between the first portion 18.1 and the pump housing 12, in which the pump piston 18 is displaceable and which separates the delivery chamber 16 from the low-pressure region 28, a low-pressure seal 78 being disposed between the second portion 18.2 and a seal carrier 60 fixed to the pump housing 12, which seal separates the low-pressure region 28 from the space 100 outside the high-pressure fuel pump 10, wherein a stepped chamber 28*d* of the low-pressure region 28 is located between the seal carrier 60 and the pump housing 12, wherein the pressure-limiting valve 22 fluidically connects the high-pressure region 29 with the stepped chamber 28*d* of the low-pressure region and opens towards the stepped chamber 28*d*, so that fuel flows out of the high-pressure region 29 into the stepped chamber 28*d*, when the pressure difference between fuel in the high-pressure region 29 and fuel in the low-pressure region 28 exceeds an opening pressure, wherein the outlet valve 37 is disposed in an outlet valve bore 37*a* of the pump housing 12, wherein the pressure-limiting valve 22 is arranged in a pressure-limiting valve bore 22*a* in the pump housing 12, which extends in the longitudinal direction LA and, starting from the stepped chamber 28*d*, opens into a high-pressure connecting bore 29*a* in the pump housing 12, which is arranged in the high-pressure region 29 and which is oriented at an angle other than 0°, for example at an angle of 5° to 15°, to the outlet valve bore 37*a*, wherein in particular the outlet 34 is formed as an outlet port 35 fixed to the pump housing 12, wherein in particular an outlet port chamber 35*a* is formed between the pump housing 12 and the outlet port 35 and wherein in particular the outlet valve bore 37*a* and the high-pressure connection bore 29*a* both extend from the outlet port chamber 35*a***.

The invention claimed is:

1. A high-pressure fuel pump for a fuel system for an internal combustion engine, the high-pressure fuel pump comprising:

an inlet for supplying fuel;

an outlet for discharging compressed fuel;

a pump housing;

a delivery chamber arranged in the pump housing;

a pump piston which is displaceable in the pump housing along a longitudinal direction and delimits the delivery chamber;

an inlet valve, which is disposed between the inlet and the delivery chamber and which opens towards the delivery chamber;

an outlet valve, which is disposed between the delivery chamber and the outlet and which opens away from the delivery chamber;

a high-pressure region, which extends fluidically between the outlet valve and the outlet;

a low-pressure region, which extends fluidically between the inlet and the inlet valve; and a pressure-limiting valve configured such that, when a pressure difference between fuel in the high-pressure region and fuel in the low-pressure region exceeds an opening pressure, the pressure-limiting valve fluidically connects the high-pressure region to the low-pressure region and opens towards the low-pressure region to enable fuel to flow out of the high-pressure region into the low-pressure region, wherein the pump piston is a stepped piston having a first piston portion that points towards the delivery chamber and has a larger diameter, and a second piston portion that has a smaller diameter and points away from the delivery chamber, wherein a high-pressure seal, in which the pump piston is displaceable and which separates the delivery chamber from the low-pressure region, is arranged between the first piston portion and the pump housing, wherein a low-pressure seal, which separates the low-pressure region from a space outside the high-pressure fuel pump is disposed between the second piston portion and a seal carrier fixed to the pump housing, a stepped chamber of the low-pressure region located between the seal carrier and the pump housing, wherein the pressure-limiting valve fluidically connects the high-pressure region to the stepped chamber of the low-pressure region and opening towards the stepped chamber, so that fuel flows out of the high-pressure region into the stepped chamber when the pressure difference between fuel in the high-pressure region and fuel in the low-pressure region exceeds the opening pressure, wherein the pump housing comprises a pump body and a pump cover, which are connected to one another, wherein the pump body and the pump cover delimit a damping region belonging to the low-pressure region, and at least one diaphragm damper is disposed in the damping region, wherein the pressure-limiting valve is disposed in a pressure-limiting valve bore formed as a through bore through the pump body, the pressure-limiting valve bore extending from the damping region to the stepped chamber and closed on a side facing the damping region by a ball or plug pressed into the pressure-limiting valve bore, wherein the pressure-limiting valve bore is configured as a stepped bore having a first bore portion that has a larger bore diameter and points towards the damping region, a second bore portion that has a smaller bore diameter and points towards the stepped chamber, and an annular step formed between the first bore portion and the second bore portion, wherein the pressure-limiting valve comprises:

a valve seat body pressed into the pressure-limiting valve bore and on which a tapered valve seat is formed;

a valve element, which has a ball shape and which comes into sealing contact with the valve seat, the pressure-limiting valve configured such that the valve element is pressed in a closing direction by a holding element, which is pressed in the closing direction by a spiral spring, which is supported on the annular step.

2. The high-pressure fuel pump according to claim 1, wherein:

the outlet valve is disposed in an outlet valve bore of the pump housing, and the outlet valve bore and the pressure-limiting valve bore intersect.

3. The high-pressure fuel pump according to claim 2, wherein:

the outlet valve comprises:

a movable valve element;

a sealing seat part disposed upstream of the valve element, the sealing seat part fixed in a pump-tight manner with a sealing seat part fixing portion;

a sealing seat, which interacts with the valve element, formed on the sealing seat part; and a fixed counter plate disposed downstream of the valve element and fixed in a pump-tight manner with a counter plate fixing portion, the fixed counter plate configured to enable mobility of the valve element in a downstream direction, and the pressure-limiting valve bore intersects the outlet valve bore between the sealing seat part fixing portion and the counter plate fixing portion.

4. The high-pressure fuel pump according to claim 1, wherein:

the outlet is formed as an outlet port fixed to the pump housing and an outlet port chamber is defined between the pump housing and the outlet port, the outlet valve is fixed in an outlet valve bore of the pump housing, the outlet valve bore extends from the outlet port chamber, the pressure-limiting valve bore is connected to the outlet port chamber via a high-pressure connecting bore that is located in the high-pressure region and extends from the outlet port chamber.

5. The high-pressure fuel pump according to claim 4, wherein the outlet valve bore and the high-pressure connection bore are disposed parallel to each other and perpendicular to the longitudinal direction.

6. The high-pressure fuel pump according to claim 4, wherein the outlet valve bore and the high-pressure connection bore are each perpendicular to the longitudinal direction and are disposed at an angle different from 0° to each other.

7. The high-pressure fuel pump according to claim 2, wherein an imaginary center axis of the outlet valve bore intersects an imaginary center axis of the pump piston.

8. The high-pressure fuel pump according to claim 2, wherein an imaginary center axis of the outlet valve bore does not intersect an imaginary center axis of the pump piston.

9. The high-pressure fuel pump according to claim 2, wherein the outlet valve bore and the pressure-limiting valve bore intersect at right angles.

10. A high-pressure fuel pump for a fuel system for an internal combustion engine, the high-pressure fuel pump comprising:

an inlet for supplying fuel;

an outlet for dispensing compressed fuel;

a pump housing;

a delivery chamber arranged in the pump housing;

a pump piston, which is displaceable in the pump housing along a longitudinal direction and limits the delivery chamber;

an inlet valve disposed between the inlet and the delivery chamber, the inlet valve opening towards the delivery chamber;

an outlet valve disposed between the delivery chamber and the outlet, the outlet valve opening away from the delivery chamber;

a high-pressure region fluidly extending between the outlet valve and the outlet;

a low-pressure region fluidly extending between the inlet and the inlet valve; and a pressure-limiting valve configured such that, when a pressure difference between fuel in the high-pressure region and fuel in the low-pressure region exceeds an opening pressure, the pressure-limiting valve fluidically connects the high-pressure region to the low-pressure region and opens towards the low-pressure region to enable fuel to flow out of the high-pressure region into the low-pressure region, wherein the pump piston is formed as a stepped piston having a first piston portion that faces towards the delivery chamber and has a larger diameter, and a second piston portion that has a smaller diameter and faces away from the delivery chamber, wherein a high-pressure seal, in which the pump piston is displaceable, and which separates the delivery chamber from the low-pressure region is disposed between the first portion and the pump housing, wherein a low-pressure seal, which separates the low-pressure region from space outside the high-pressure fuel pump, is disposed between the second portion, and a seal carrier fixed to the pump housing, wherein a stepped chamber of the low-pressure region is disposed between the seal carrier and the pump housing, wherein the pressure-limiting valve fluidly connects the high-pressure region to the stepped chamber of the low-pressure region and opens toward the stepped chamber, such that fuel drains from the high-pressure region into the stepped chamber, when the pressure difference between the fuel in the high-pressure region and the fuel in the low-pressure region exceeds the opening pressure, wherein the outlet valve is disposed in an outlet valve bore of the pump housing the outlet valve comprising:

a movable valve element and a sealing seat part disposed upstream of the valve element, the sealing seat part fixed in a pump tight manner with a sealing seat part fixing portion;

a sealing seat, which cooperates with the valve element, formed on the sealing seat part; and a fixed counter plate disposed downstream of the valve element and fixed in a pump tight manner with a counter plate fixing portion, the fixed counter plate configured to prevent mobility of the valve element in a downstream direction, and wherein the pressure-limiting valve is disposed in a pressure-limiting valve bore in the pump housing, the pressure-limiting valve bore extending in the longitudinal direction and, starting from the stepped chamber, opens into the outlet valve bore.

11. The high-pressure fuel pump according to claim 10, wherein the pressure-limiting valve bore opens into the outlet valve bore between the sealing seat part fixing portion and the counter plate fixing portion.

12. A high-pressure fuel pump for a fuel system for an internal combustion engine, the high-pressure fuel pump comprising:

an inlet for supplying fuel;

an outlet for dispensing compressed fuel;

a pump housing;

a delivery chamber arranged in the pump housing;

a pump piston, which is displaceable in the pump housing along a longitudinal direction and limits the delivery chamber;

an inlet valve disposed between the inlet and the delivery chamber, the inlet valve opening towards the delivery chamber;

an outlet valve disposed between the delivery chamber and the outlet, the outlet valve opening away from the delivery chamber;

a high-pressure region fluidly extending between the outlet valve and the outlet;

a low-pressure region fluidly extending between the inlet and the inlet valve; and a pressure-limiting valve configured such that, when a pressure difference between fuel in the high-pressure region and fuel in the low-pressure region exceeds an opening pressure, the pressure-limiting valve fluidically connects the high-pressure region to the low-pressure region and opens towards the low-pressure region to enable fuel to flow out of the high-pressure region into the low-pressure region, wherein the pump piston is formed as a stepped piston having a first piston portion that faces towards the delivery chamber and has a larger diameter, and a second piston portion that has a smaller diameter and faces away from the delivery chamber, wherein a high-pressure seal, in which the pump piston is displaceable, and which separates the delivery chamber from the low-pressure region is disposed between the first portion and the pump housing, wherein a low-pressure seal, which separates the low-pressure region from space outside the high-pressure fuel pump, is disposed between the second portion, and a seal carrier fixed to the pump housing, wherein a stepped chamber of the low-pressure region is disposed between the seal carrier and the pump housing, wherein the pressure-limiting valve fluidly connects the high-pressure region to the stepped chamber of the low-pressure region and opens toward the stepped chamber, such that fuel drains from the high-pressure region into the stepped chamber, when the pressure difference between the fuel in the high-pressure region and the fuel in the low-pressure region exceeds the opening pressure, wherein the outlet valve is disposed in an outlet valve bore of the pump housing, wherein the pressure-limiting valve is disposed in a pressure-limiting valve bore in the pump housing, and extending in the longitudinal direction, the stepped chamber opening from the pressure-limiting valve bore into a high-pressure connecting bore in the pump housing, the pressure-limiting valve disposed in the high-pressure region and oriented at an angle other than 0° to the outlet valve bore, wherein the pump housing comprises a pump body and a pump cover, which are connected to one another, wherein the pump body and the pump cover delimit a damping region belonging to the low-pressure region, and wherein the pressure relief valve bore is configured as a through-bore through the pump body, extending from the damping area to the step chamber, and closed on a side facing the damping area by a ball pressed into the pressure relief valve bore or a plug pressed into the pressure relief valve bore.

13. The high-pressure fuel pump according to claim 12, wherein:

the outlet is configured as an outlet port fixed to the pump housing, an outlet port chamber formed between the pump housing and the outlet port, and the outlet valve bore and the high-pressure connecting bore both extend from the outlet port chamber.

* * * * *